United States Patent
Park et al.

(10) Patent No.: US 11,016,527 B2
(45) Date of Patent: May 25, 2021

(54) ELECTRONIC DEVICE INCLUDING FOLDABLE HOUSING AND FLEXIBLE DISPLAY

(71) Applicant: Samsung Electronics Co., Ltd., Gyeonggi-do (KR)

(72) Inventors: Jungsik Park, Gyeonggi-do (KR); Jeong Woo, Gyeonggi-do (KR); Gidae Kim, Gyeonggi-do (KR); Kangmoon Kim, Gyeonggi-do (KR); Moohyun Baek, Gyeonggi-do (KR); Jungchul An, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/402,906

(22) Filed: May 3, 2019

(65) Prior Publication Data
US 2019/0339739 A1   Nov. 7, 2019

(30) Foreign Application Priority Data
May 3, 2018   (KR) .................. 10-2018-0051194

(51) Int. Cl.
*G06F 1/16* (2006.01)
*H04M 1/02* (2006.01)

(52) U.S. Cl.
CPC .......... *G06F 1/1616* (2013.01); *G06F 1/1652* (2013.01); *G06F 1/1681* (2013.01); *H04M 1/0218* (2013.01); *H04M 1/0268* (2013.01); *H04M 2201/38* (2013.01)

(58) Field of Classification Search
None
See application file for complete search history.

(56) References Cited

U.S. PATENT DOCUMENTS

| 4,642,159 A * | 2/1987 | Weresch ............. H05K 13/003 140/139 |
| 9,348,450 B1 * | 5/2016 | Kim ...................... G06F 3/0412 |
| 9,696,763 B2 * | 7/2017 | Mok ..................... G06F 1/1656 |
| 2012/0275099 A1 * | 11/2012 | Yamami ............. H04M 1/0208 361/679.01 |
| 2013/0314611 A1 * | 11/2013 | Okutsu ............... H05K 5/0234 348/739 |
| 2014/0042293 A1 * | 2/2014 | Mok ................... H04M 1/0268 248/682 |

(Continued)

FOREIGN PATENT DOCUMENTS

| EP | 3 065 025 | 9/2016 |
| EP | 3 076 265 | 10/2016 |

(Continued)

OTHER PUBLICATIONS

European Search Report dated Jul. 11, 2019 issued in counterpart application No. 19172093.7-1216, 15 pages.

(Continued)

*Primary Examiner* — Anthony Q Edwards
*Assistant Examiner* — Rashen E Morrison
(74) *Attorney, Agent, or Firm* — The Farrell Law Firm, P.C.

(57) ABSTRACT

Disclosed is an electronic device capable of maintaining flatness of a display by minimizing stress occurring at an inflection point at which a length of the display changes rapidly upon folding.

19 Claims, 12 Drawing Sheets

(56) References Cited

U.S. PATENT DOCUMENTS

| | | | |
|---|---|---|---|
| 2014/0111954 A1* | 4/2014 | Lee | G06F 1/1641 361/749 |
| 2014/0126121 A1* | 5/2014 | Griffin | H04M 1/0216 361/679.01 |
| 2015/0085433 A1* | 3/2015 | Kim | G06F 1/1624 361/679.01 |
| 2015/0227223 A1 | 8/2015 | Kang et al. | |
| 2015/0301338 A1* | 10/2015 | Van Heugten | G09G 3/32 345/8 |
| 2016/0109908 A1 | 4/2016 | Siddiqui | |
| 2016/0259514 A1 | 9/2016 | Sang et al. | |
| 2016/0270209 A1 | 9/2016 | Cho | |
| 2016/0291642 A1 | 10/2016 | Kwak et al. | |
| 2016/0338188 A1 | 11/2016 | Dighde et al. | |
| 2016/0349800 A1 | 12/2016 | Kim et al. | |
| 2016/0378334 A1 | 12/2016 | Liu et al. | |
| 2017/0006725 A1 | 1/2017 | Ahn et al. | |
| 2017/0052566 A1 | 2/2017 | Ka et al. | |
| 2017/0064879 A1 | 3/2017 | Lee et al. | |
| 2017/0123455 A1 | 5/2017 | Park et al. | |
| 2017/0236877 A1 | 8/2017 | Jeong | |
| 2017/0264723 A1 | 9/2017 | Mok et al. | |
| 2017/0365197 A1 | 12/2017 | Kim et al. | |
| 2018/0110139 A1 | 4/2018 | Seo et al. | |
| 2019/0036272 A1* | 1/2019 | Rudisill | H01R 13/645 |

FOREIGN PATENT DOCUMENTS

| | | |
|---|---|---|
| EP | 3 105 658 | 12/2016 |
| EP | 3 107 270 | 12/2016 |
| JP | 4695217 | 3/2011 |
| JP | 2017-538993 | 12/2017 |
| KR | 1020160110688 | 9/2016 |
| KR | 1020170024204 | 3/2017 |
| KR | 1020170095445 | 8/2017 |
| WO | WO 2015/119474 | 8/2015 |

OTHER PUBLICATIONS

International Search Report dated Aug. 14, 2019 issued in counterpart application No. PCT/KR2019/004982, 3 pages.
EP Summons to Attend Oral Proceedings dated Dec. 9, 2020 issued in counterpart application No. 19172093.7-1216, 10 pages.

* cited by examiner

ELECTRONIC DEVICE INCLUDING FOLDABLE HOUSING AND FLEXIBLE DISPLAY

CROSS-REFERENCE TO RELATED APPLICATION(S)

The present application is based on and claims priority under 35 U.S.C. § 119(a) to Korean Patent Application No. 10-2018-0051194, filed on May 3, 2018 in the Korean Intellectual Property Office, the disclosure of which is incorporated by reference herein in its entirety.

BACKGROUND

1. Field

The disclosure relates generally to an electronic device, and more particularly, to an electronic device including a foldable housing and a flexible display.

2. Description of Related Art

While use of electronic devices including portable terminals such as smart phones increases, functions have been provided in the electronic devices.

In order to support a multimedia function such as a camera function and a moving picture reproduction function, the electronic device may include a display.

As the role of the display is vital, it is necessary for the electronic device to have an increased size. In recent years, the number of foldable terminals including flexible displays has gradually increased.

A display of the electronic device includes an active region that displays an image and an inactive region that is an edge portion of the active region and in which an image is not displayed.

A touch panel for receiving an input of a touch position of a user may be disposed in the active region of the display, and electronic components such as a camera, a receiver, and a sensor may be disposed in the active region of the display.

In electronic devices such as a foldable terminal, upon folding, stress may occur due to the difference in length according to a shape of the display. As such, flatness of the display may not be maintained.

Accordingly, there is a need in the art for a foldable terminal that maintains its structural integrity and resists stress even when folded.

SUMMARY

An aspect of the disclosure is to address at least the above-mentioned problems and/or disadvantages and to provide at least the advantages described below. Accordingly, an aspect of the disclosure is to provide an electronic device that can maximize an active region of the display while minimizing a black masking area.

An aspect of the disclosure is to provide an electronic device capable of maintaining flatness of a display by minimizing stress occurring at an inflection point at which a length of the display changes rapidly upon folding.

In accordance with an aspect of the disclosure, an electronic device includes a foldable housing includes a first housing structure; and a second housing structure connected foldably to the first structure, wherein the first structure and the second structure are foldable with respect to each other about a first axis extending in a first direction, such that the second structure faces the first structure in a folded state, and such that the first structure and the second structure form a planar structure in an unfolded state, wherein the first structure and the second structure together define a recess that includes, when viewed from above the recess in the unfolded state, a first region between a first portion of the first structure and a first portion of the second structure so as to have a first width extending in a second direction perpendicular to the first direction, and a second region between a second portion of the first structure and a second portion of the second structure so as to have a second width extending in the second direction, wherein the second width is longer in length than the first width, wherein the first portion of the second structure is closer in distance to the first axis than the second portion of the second structure is to the first axis, and wherein a flexible display positioned in the recess, the flexible display including a first portion positioned in the first region of the recess, and a second portion positioned in the second region of the recess.

BRIEF DESCRIPTION OF THE DRAWINGS

The above and other aspects, features, and advantages of certain embodiments of the disclosure will be more apparent from the following detailed description in conjunction with the accompanying drawings, in which.

DETAILED DESCRIPTION

Hereinafter, the present disclosure will be described in detail with reference to the accompanying drawings. Detailed descriptions of known functions and configurations incorporated herein will be omitted when it may make the subject matter of the present disclosure rather unclear.

Figure 1:
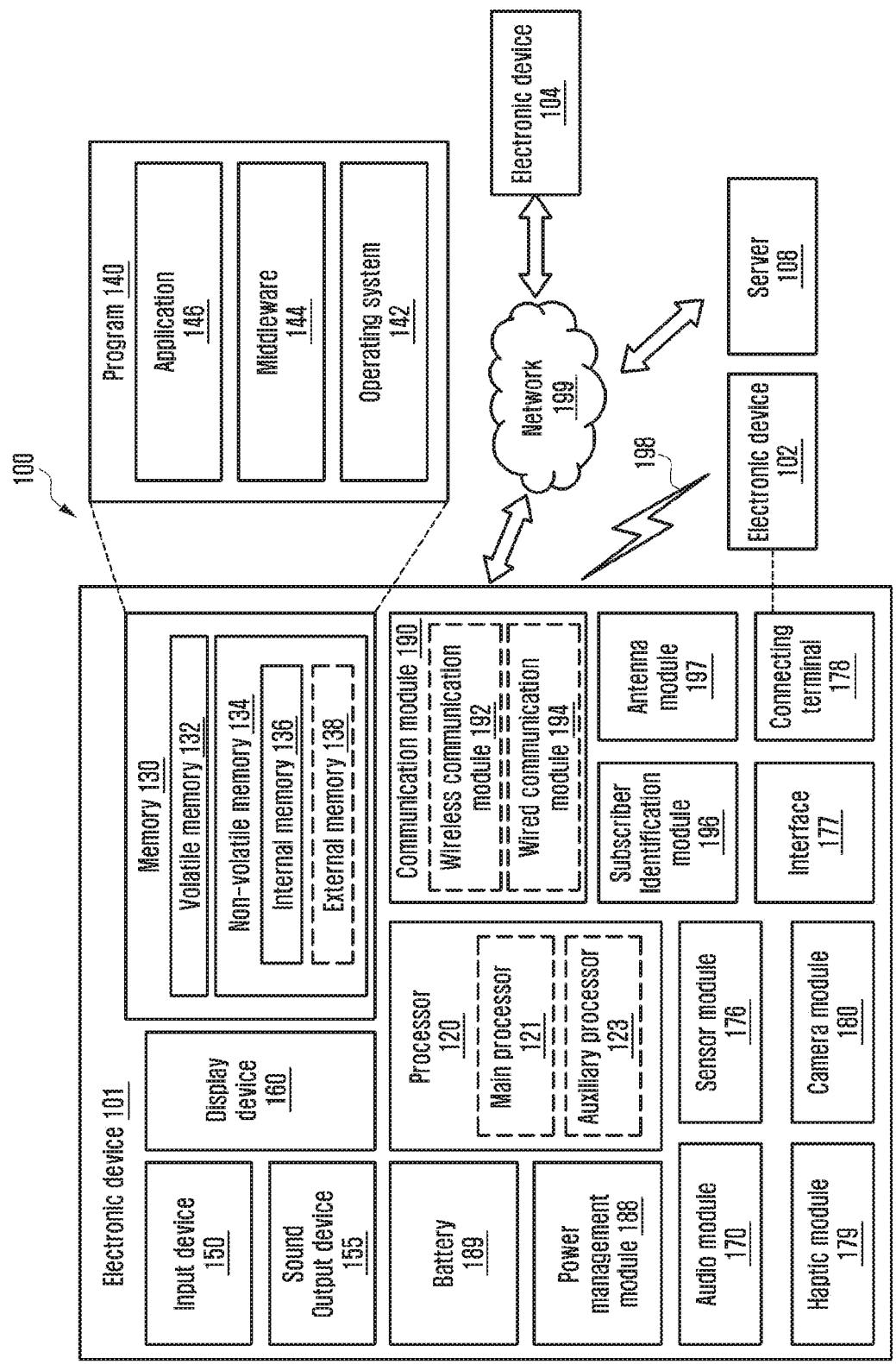
FIG. 1 illustrates a configuration of an electronic device in a network environment, according to an embodiment.

FIG. 1 illustrates an electronic device 101 in a network environment 100, according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176, (e.g., a fingerprint sensor, an iris sensor, or an illuminance sensor) may be implemented as embedded in the display device 160 (e.g., a display).

The processor 120 may execute software (e.g., a program 140) to control at least one other component (e.g., a hardware or software component) of the electronic device 101 coupled with the processor 120, and may perform data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store data used by at least one component (e.g., the processor 120 or the sensor module 176) of the electronic device 101. The data may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include a microphone, a mouse, or a keyboard.

The sound output device 155 may output sound signals to the outside of the electronic device 101. The sound output device 155 may include a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. The interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of a power management integrated circuit (PMIC).

The battery 189 may supply power to at least one component of the electronic device 101. The battery 189 may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module 197 may include one or more antennas, and, therefrom, at least one antenna appropriate for a communication scheme used in the communication network, such as the first network 198 or the second network 199, may be selected by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to embodiments may be one of various types of electronic devices. The electronic devices may include a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that embodiments of the disclosure and the terms used therein are not intended to limit the technological features set forth herein to particular embodiments and include changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Figure 2:
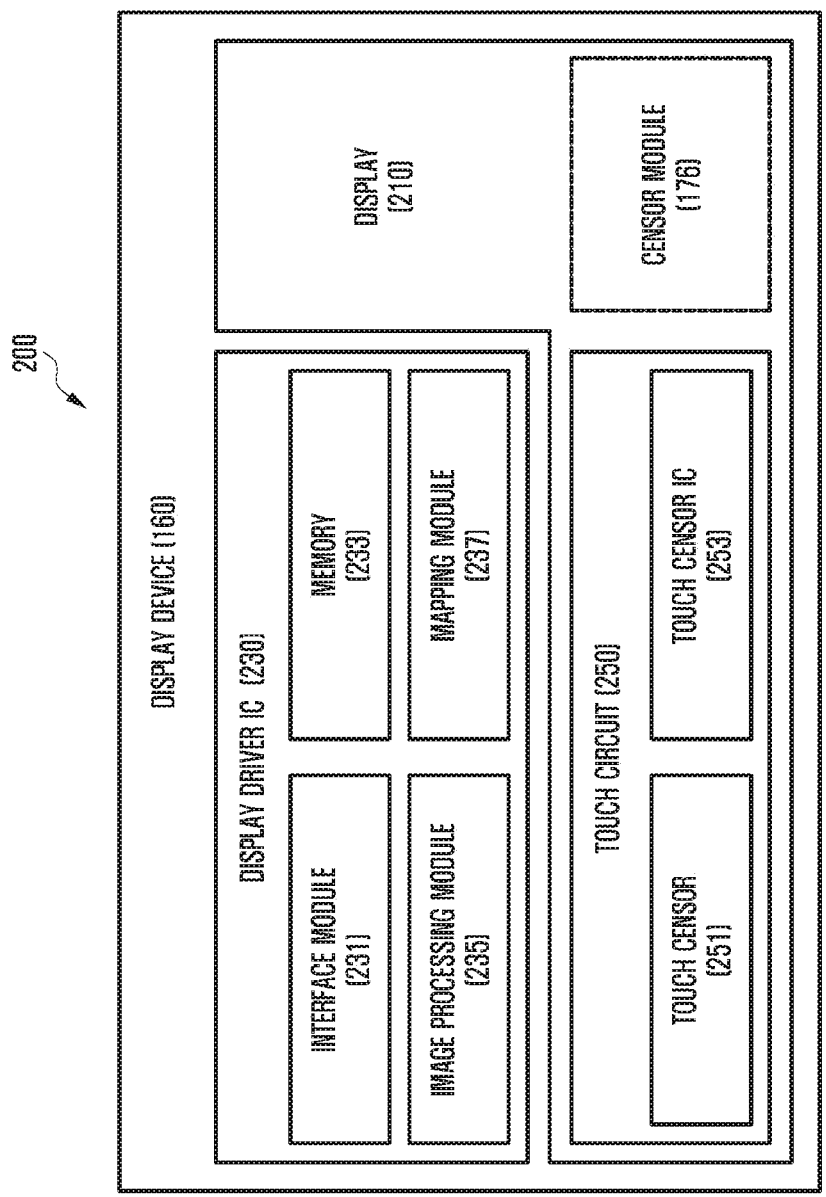
FIG. 2 illustrates a configuration of a display device, according to an embodiment.

FIG. 2 is a block diagram 200 illustrating the display device 160, according to an embodiment.

Referring to FIG. 2, the display device 160 may include a display 210 and a display driver integrated circuit (DDI)

230 to control the display 210. The DDI 230 may include an interface module 231, memory 233, such as buffer memory, an image processing module 235, and a mapping module 237. The DDI 230 may receive image information that contains image data or an image control signal corresponding to a command to control the image data from another component of the electronic device 101 via the interface module 231. For example, according to an embodiment, the image information may be received from the processor 120, such as the main processor 121 or an AP, or the auxiliary processor 123, such as a GPU, operated independently from the function of the main processor 121. The DDI 230 may communicate with touch circuitry 250 or the sensor module 176 via the interface module 231, and may store at least part of the received image information in the memory 233 on a frame by frame basis.

The image processing module 235 may perform pre-processing or post-processing, such as adjustment of resolution, brightness, or size, with respect to at least part of the image data, based at least in part on one or more characteristics of the image data or the display 210.

The mapping module 237 may generate a voltage value or a current value corresponding to the image data pre-processed or post-processed by the image processing module 235. The generating of the voltage value or current value may be performed based at least in part on one or more attributes of the pixels, such as an array including a red, green, blue (RGB) stripe, a pentile structure of the pixels, or the size of each subpixel. At least some pixels of the display 210 may be driven based at least in part on the voltage value or the current value, such that visual information such as a text, an image, or an icon corresponding to the image data may be displayed via the display 210.

The display device 160 may further include the touch circuitry 250, which includes a touch sensor 251 and a touch sensor IC 253 to control the touch sensor 251. The touch sensor IC 253 may control the touch sensor 251 to sense a touch input or a hovering input with respect to a certain position on the display 210. To achieve this, the touch sensor 251 may measure a change in a signal, such as a voltage, a quantity of light, a resistance, or a quantity of one or more electric charges, corresponding to the certain position on the display 210. The touch circuitry 250 may provide input information, such as a position, an area, a pressure, or a time, indicative of the touch input or the hovering input detected via the touch sensor 251 to the processor 120. At least part of the touch circuitry 250, such as the touch sensor IC 253, may be formed as part of the display 210 or the DDI 230, or as part of another component disposed outside the display device 160, such as the auxiliary processor 123.

The display device 160 may further include at least one sensor, such as a fingerprint sensor, an iris sensor, a pressure sensor, or an illuminance sensor of the sensor module 176 or a control circuit for the at least one sensor. In such a case, the at least one sensor or the control circuit for the at least one sensor may be embedded in one portion of a component of the display device 160.

For example, when the sensor module 176 embedded in the display device 160 includes a biometric sensor, the biometric sensor may obtain biometric information corresponding to a touch input received via a portion of the display 210. As another example, when the sensor module 176 embedded in the display device 160 includes a pressure sensor, the pressure sensor may obtain pressure information corresponding to a touch input received via a partial or an entire area of the display 210. The touch sensor 251 or the sensor module 176 may be disposed between pixels in a pixel layer of the display 210, or over or under the pixel layer.

Figure 3:
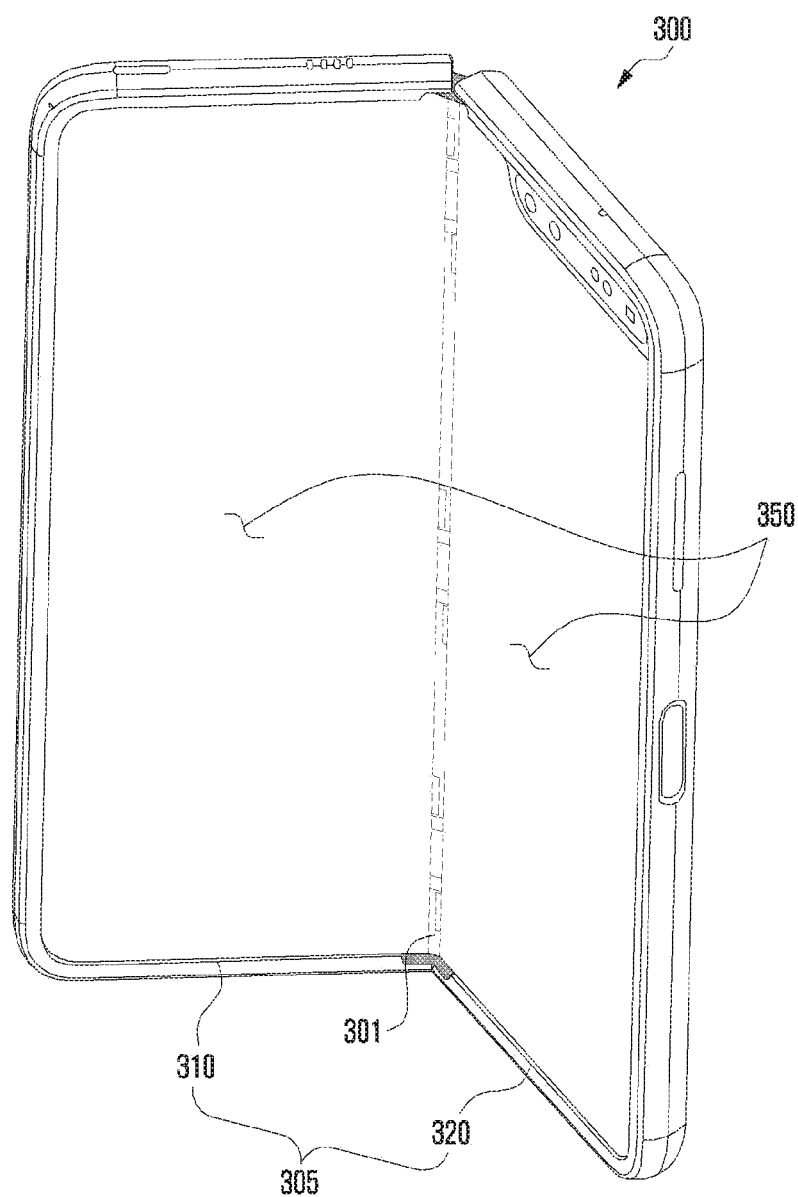
FIG. 3 illustrates a configuration of an electronic device including a foldable housing and a flexible display, according to an embodiment.

FIG. 3 illustrates a configuration of an electronic device 300 including a foldable housing 305 and a flexible display 350, according to an embodiment.

With reference to FIG. 3, an electronic device 300 may include a foldable housing 305 and a flexible display 350.

According to an embodiment, the foldable housing 305 may include a first housing structure 310 and a second housing structure 320. A hinge 301 may be mounted between the first housing structure 310 and the second housing structure 320. The second housing structure 320 may be connected foldably to the first housing structure 310 through the hinge 301. When the first housing structure 310 and the second housing structure 320 are in a planar state by unfolding, the hinge 301 may not be exposed to upper portions of the first housing structure 310 and the second housing structure 320 or an upper portion of the flexible display 350. When the first housing structure 310 and the second housing structure 320 are in a planar state by unfolding, the hinge 301 may be exposed to upper portions of the first housing structure 310 and the second housing structure 320 or an upper portion of the flexible display 350.

Figure 4:
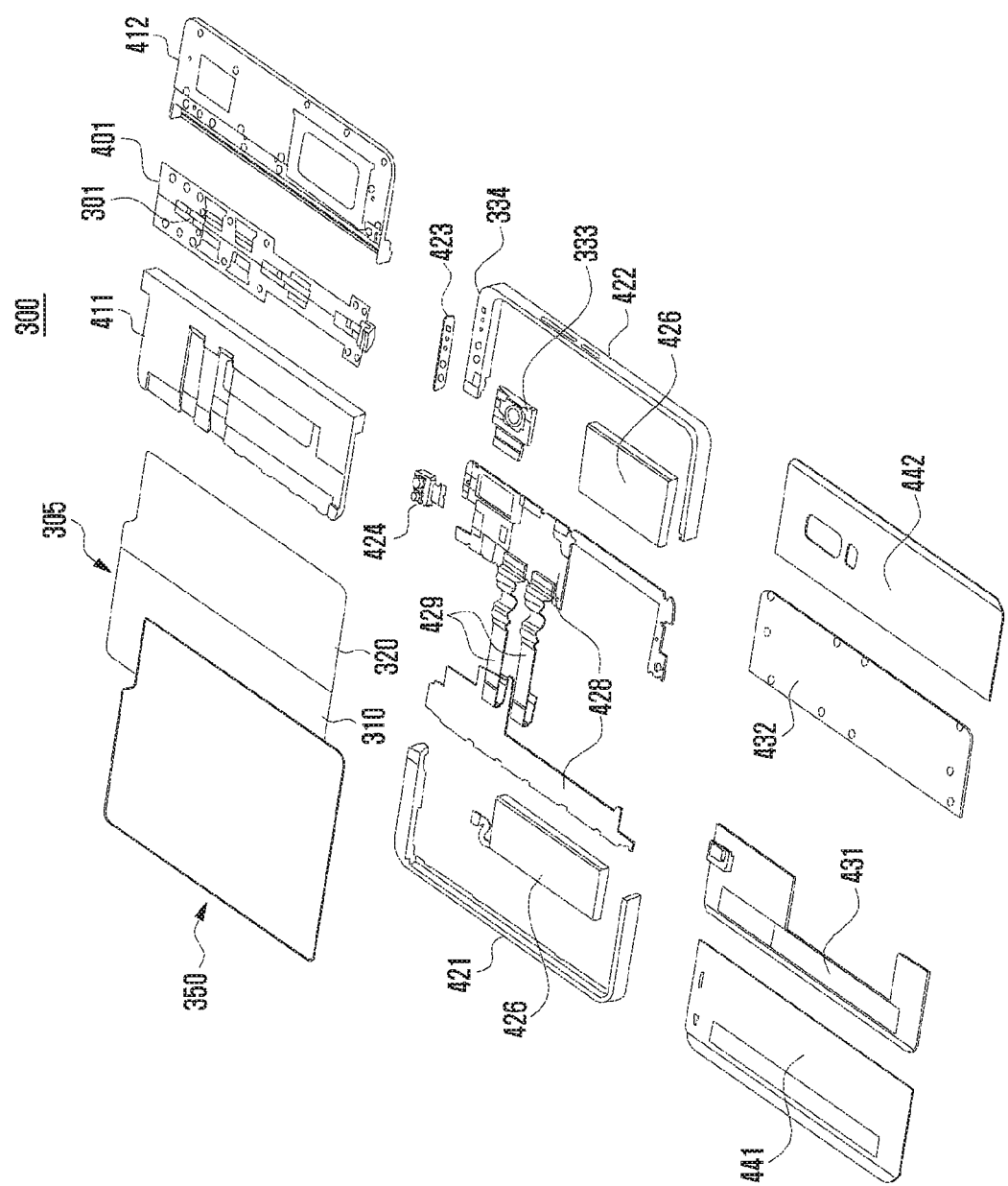
FIG. 4 is an exploded perspective view illustrating an assembling process of an electronic device including a foldable housing and a flexible display, according to an embodiment.

FIG. 4 illustrates an assembling process of the electronic device 300 including the foldable housing 305 and the flexible display 350 according to an embodiment.

With reference to FIG. 4, the flexible display 350 may be disposed on and coupled to the foldable housing 305. The foldable housing 305 may include a first housing structure 310 and a second housing structure 320. The flexible display 350 may be disposed on the first housing structure 310 and the second housing structure 320.

The hinge 301 may be mounted in a hinge plate 401. A first inner bracket 411 may be mounted in one side of the hinge plate 401, such as the left side), and a second inner bracket 412 may be mounted in the other side of the hinge plate 401, such as the right side. In another embodiment, the first housing structure 310 and the first inner bracket 411 may be formed in one unit, and the second housing structure 320 and the second inner bracket 412 may be formed in one unit.

The foldable housing 305 in which the flexible display 350 is mounted may be coupled onto the first inner bracket 411 and the second inner bracket 412. For example, the first housing structure 310 may be disposed on the first inner bracket 411, and the second housing structure 320 may be disposed on the second inner bracket 412.

A first sliding bracket 421 may be mounted in an outer surface of the first housing structure 310 and the first inner bracket 411. A second sliding bracket 422 may be mounted in outer surfaces of the second housing structure 320 and the second inner bracket 412. A device mounting portion 334 having at least one hole may be formed in at least part of the second sliding bracket 422. Window glass 423 may be disposed on the device mounting portion 334 in order to cover the device mounting portion 334 from dust inflow or an external impact.

A camera 333, a sensor 424, at least one battery 426, at least one printed circuit board (PCB) 428, and at least one flexible printed circuit board (FPCB) 429 may be provided in the first sliding bracket 421 and the second sliding bracket 422. Components included in the first sliding bracket 421 and the second sliding bracket 422; however, at least one component may be omitted or other components may be added.

A first rear plate 431 may be mounted in a rear surface of the first inner bracket 411. A second rear plate 432 may be mounted in a rear surface of the second inner bracket 412.

A first rear window 441 may be mounted in a rear surface of the first rear plate 431. A second rear window 442 may be mounted in a rear surface of the second rear plate 432.

Figure 5:
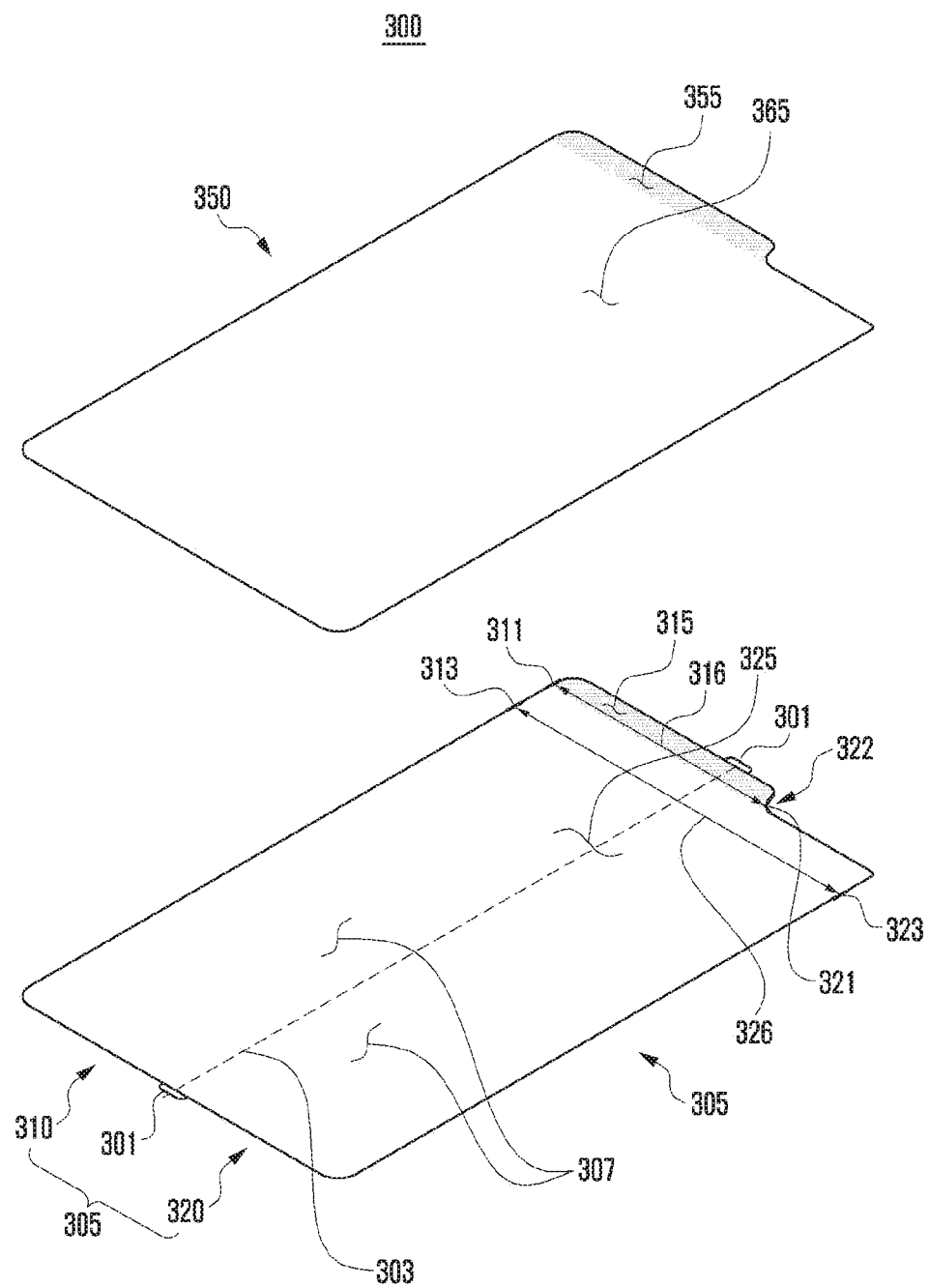
FIG. 5 is an exploded perspective view schematically illustrating some configurations of an electronic device including a foldable housing and a flexible display, according to an embodiment.
Figure 6:
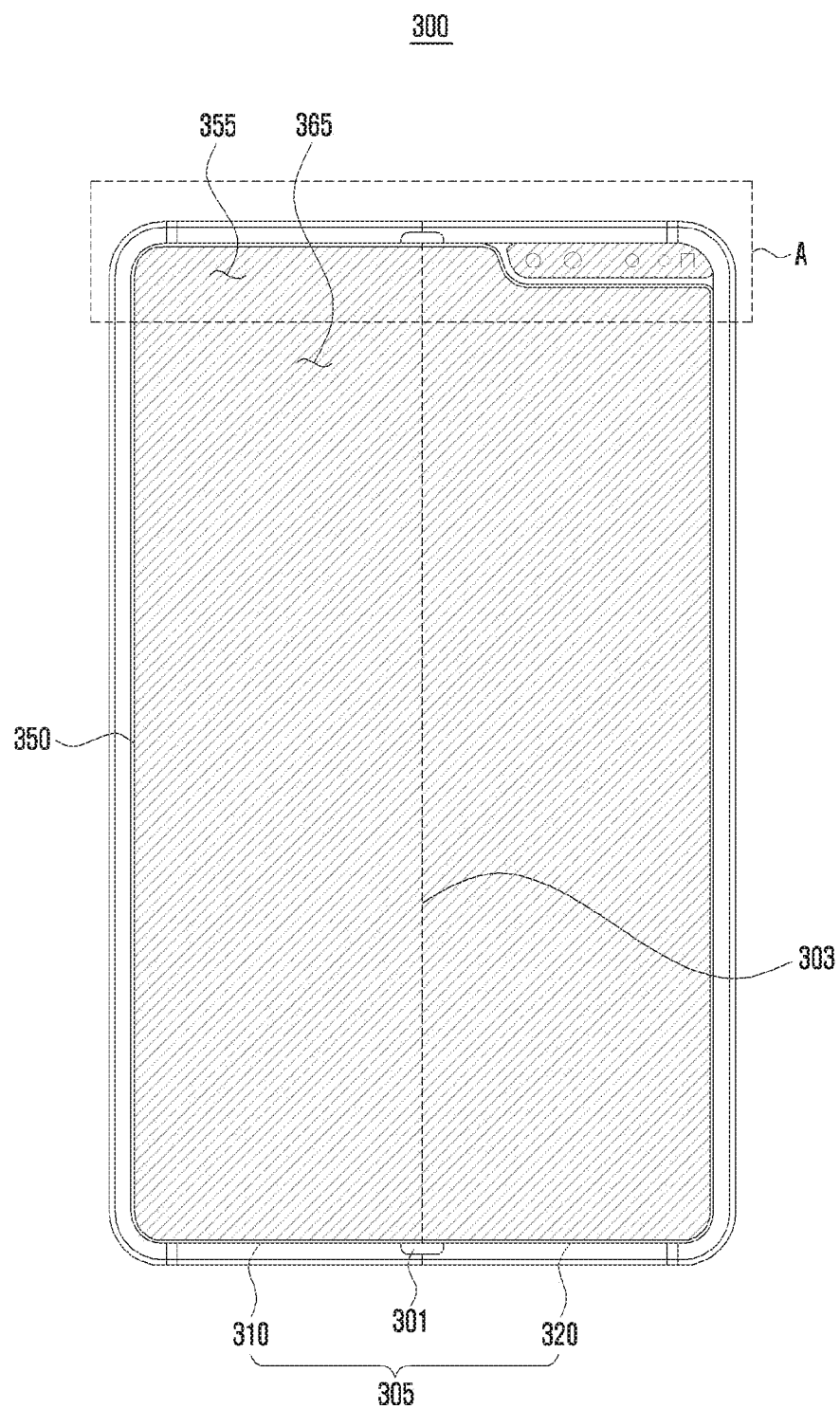
FIG. 6 illustrates a coupling state of a configuration of an electronic device including a foldable housing and a flexible display, according to an embodiment.

FIG. 5 is an exploded perspective view schematically illustrating some configurations of an electronic device 300 including a foldable housing 305 and a flexible display 350 according to an embodiment. FIG. 6 illustrates a coupling state of a configuration of an electronic device 300 including a foldable housing 305 and a flexible display 350 according to an embodiment.

With reference to FIGS. 5 and 6, an electronic device 300 may include a foldable housing 305 and a flexible display 350.

The foldable housing 305 may support the flexible display 350. For example, even if a user presses the flexible display 350 through a finger or a touch pen, the foldable housing 305 may support the flexible display 350 to enable the flexible display 350 to maintain a predetermined shape.

The first housing structure 310 and the second housing structure 320 may be folded with respect to each other about a first axis 303 extending in a first direction such as vertical direction). The first axis 303 may correspond to an operation direction of the hinge 301 or an operation axis direction of the hinge 301.

When the second housing structure 320 is folded towards the first housing structure 310, the second housing structure 320 may face the first housing structure 310. When the first housing structure 310 and the second housing structure 320 are unfolded such as spread), the first housing structure 310 and the second housing structure 320 may form a planar structure.

The first housing structure 310 and the second housing structure 320 may together define a recess 307. For example, the first housing structure 310 and the second housing structure 320 may be coupled together to determine a shape or boundary of the recess 307.

When the first housing structure 310 and the second housing structure 320 are unfolded, when viewed from the top, the recess 307 may include a first region 315 and a second region 325.

The first region 315 may include an area between a first portion 311 of the first housing structure 310 and a first portion 321 of the second housing structure 320 so as to have a first width 316 extending in a second direction perpendicular to a first direction. The first portion 311 of the first housing structure 310 may be at least part of the upper end of one side of the first housing structure 310 based on FIGS. 5 and 6. The first portion 321 of the second housing structure 320 may be part of an area abutting a cutting portion 322 formed in an oblique line in an upper portion of the second housing structure 320.

The second region 325 may include an area between a second portion 313 of the first housing structure 310 and a second portion 323 of the second housing structure 320 so as to have a second width 326 extending in the second direction. The second portion 313 of the first housing structure 310 may be at least part of an area other than the upper end of one side of the first housing structure 310, as illustrated in FIG. 5. For example, the second portion 313 of the first housing structure 310 may be at least part of an area other than the first portion 311 of the first housing structure 310. The second portion 323 of the second housing structure 320 may be at least part of an area other than the first portion 321 of the second housing structure 320.

The second width 326 of the second region 325 may be longer than the first width 316 of the first region 315. The first portion 321 of the second housing structure 320 may be closer to the first axis 303 than the second portion 323. The first portion 321 of the second housing structure 320 may be closer to the first axis 303 than the first portion 311 of the first housing structure 310 is to the first axis 303.

The flexible display 350 may be positioned in the recess 307 defined by the first housing structure 310 and the second housing structure 320. The flexible display 350 may include a first portion 355 positioned in the first region 315 of the recess 307. The flexible display 350 may include a second portion 365 positioned in the second region 325 of the recess 307.

In the foregoing embodiment described with reference to FIGS. 5 and 6, the first housing structure 310 is positioned at the left side of the electronic device 300, and the second housing structure 320 is positioned at the right side of the electronic device 300. However, the first housing structure 310 may be positioned at the right, and the second housing structure 320 may be positioned at the left, and positions of the first housing structure 310 and the second housing structure 320 may be changed.

Figure 7:
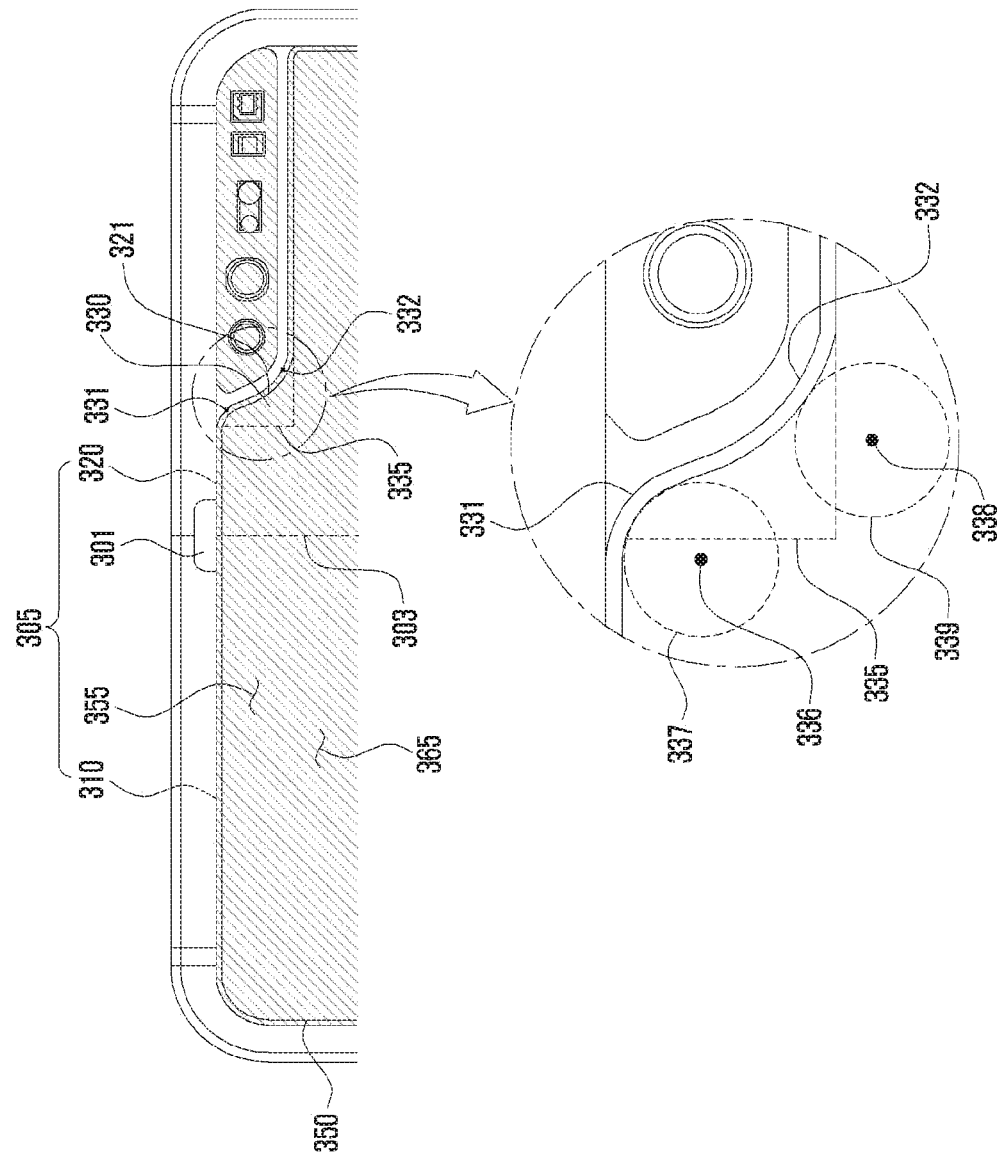
FIG. 7 is a partially enlarged view of a portion "A" illustrated in FIG. 6.
Figure 8:
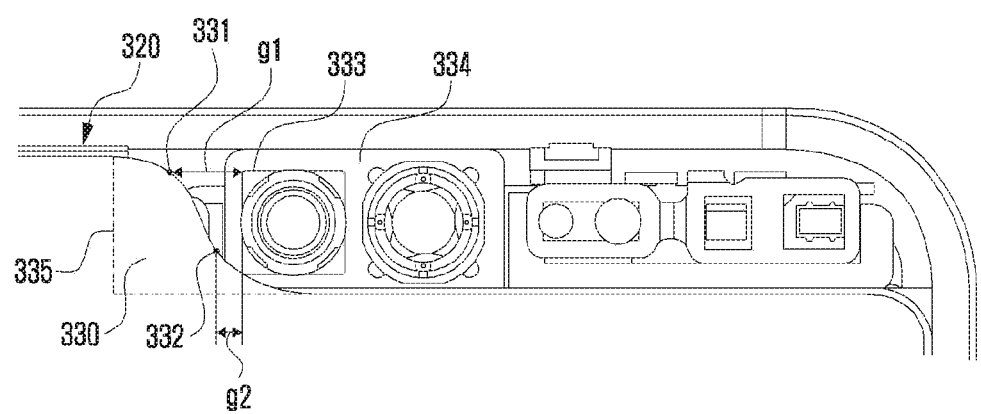
FIG. 8 is an enlarged view illustrating some configurations of FIG. 7.

FIG. 7 is a partially enlarged view of a portion "A" illustrated in FIG. 6. FIG. 8 is an enlarged view illustrating some configurations of FIG. 7.

A description related to FIGS. 7 and 8 may be described in association with the components of FIGS. 5 and 6.

With reference to FIG. 7, the first portion 321 of the second housing structure 320 may include a first periphery 330 abutting the first portion 355 of the flexible display 350 and extending generally in a first direction. One side surface of the first periphery 330 may form at least part of the cutting portion 322 of FIG. 5.

At least part of the first periphery 330 extends in a second direction that generally forms an acute angle in the first direction to enable the first width 316 to increase towards the second portion 365 of the flexible display 350. Therefore, the end of the first periphery 330 or the cutting portion 322 may have an oblique line shape. The first periphery 330 may include at least one curved portion, such as 331 and 332, including a first curved portion 331 formed at an upper portion of the first periphery 330 and a second curved portion 332 formed at a lower portion of the first periphery 330.

The upper portion may be close to the first portion 355 of the flexible display 350, and the lower portion may be close to the second portion 365 of the flexible display 350. For example, the lower portion may be closer to the second portion 365 of the flexible display 350 than the upper portion.

With reference to FIG. 7, the first curved portion 331 may be part of a first imaginary circle 337 having a first imaginary center 336, and the second curved portion 332 may be part of a second imaginary circle 339 having a second imaginary center 338. The first imaginary center 336 and the second imaginary center 338 may be on opposite sides of an imaginary line 335 that may be formed by at least part of the first periphery 330.

The first imaginary center 336 may be between the first portion 311 and the second portion 313 of the first housing structure 310 and the imaginary line 335. The second imaginary center 338 may be between the first portion 321 and the second portion 323 of the second housing structure 320 and the imaginary line 335.

With reference to FIG. 8, a camera 333 may be mounted in the device mounting portion 334 disposed abutting the first periphery 330. A gap g1 between the first curved portion 331 of the first periphery 330 and an upper portion of the camera 333 may be larger than a gap g2 between the second curved portion 332 and a lower portion of the camera 333. A shape from the first curved portion 331 to the second curved portion 332 of the first periphery 330 may be a round oblique line shape.

According to an embodiment, because an active region of the flexible display 350 is further extended by the first periphery 330 extended from the imaginary line 335, a black masking area of the electronic device 300 may be reduced. Further, by forming the first periphery 330 to have a round oblique line shape, when the first housing structure 310 and the second housing structure 320 are folded, the electronic device 300 according to the disclosure minimizes stress that may occur at a inflection point, such as the first periphery 330, in which a length of the flexible display 350 changes rapidly, thereby maintaining flatness of the flexible display 350.

Figure 9:
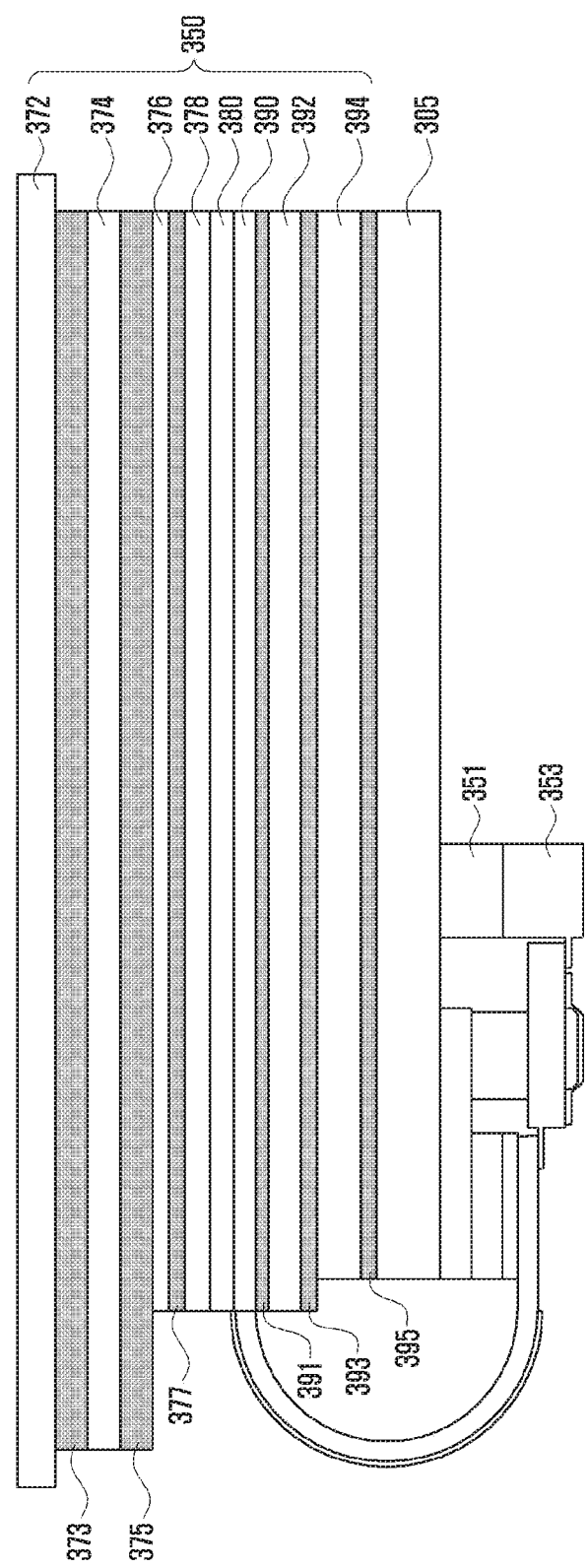
FIG. 9 illustrates a configuration of a flexible display of an electronic device, according to an embodiment.

FIG. 9 illustrates a configuration of a flexible display 350 of an electronic device 300, according to an embodiment.

With reference to FIG. 9, the flexible display 350 may include a plurality of layers that are stacked one over another. At least part of the plurality of layers may not be in contact with the first periphery 330. The flexible display 350 may be disposed not to be in contact with the first periphery 330.

The flexible display 350 may include a window layer 372, impact absorbing layer 374, polarizer 376, organic light emitting layer 378, touch-sensitive layer 380, touch screen panel 390, protective film 392, and cushion layer 394. The flexible display 350 may be disposed on the foldable housing 305. A first adhesive layer 373 to a sixth adhesive layer 395 to be described later may include a pressure sensitive adhesive or an optical clear adhesive. The window layer 372 may be replaced with a transparent polyimide film. The components of the flexible display 350 are an example, and at least one component may be omitted or other components may be added. The components of the flexible display 350 may be changed to interlayer dispositions.

The window layer 372 may protect the touch screen panel 390 in the flexible display 350 from an external impact or a scratch. The window layer 372 may be made of a transparent material, may transmit light to the inside or outside of the electronic device 300, may be cover glass made of tempered glass, reinforced plastic, or a flexible polymer material, and may include polyimide window.

The impact absorbing layer 374 may absorb an impact transferred from the outside to the window layer 372 and may be made of a cushioning material such as a sponge, polyimide, or epoxy that may transmit light. The window layer 372 and the impact absorbing layer 374 may be bonded through the first adhesive layer 373.

The polarizer 376 may polarize incident light applied to the touch screen panel 390 side and reflected light reflected from the touch screen panel 390, may polarize light generated in the organic light emitting layer 378 to implement a desired color, and may be formed with a poly ethylene terephthalate (PET) film or a tri-acetyl cellulose (TAC) film. The impact absorbing layer 374 and the polarizer 376 may be bonded through a second adhesive layer 375.

When electricity is supplied to the electronic device 300, the organic light emitting layer 378 may emit light autonomously. The organic light emitting layer 378 may include red, green, and blue fluorescent or phosphorus organic compounds. The polarizer 376 and the organic light emitting layer 378 may be bonded through a third adhesive layer 377.

The touch-sensitive layer 380 is bonded on the touch screen panel 390, and when the user touches the window layer 372 using a finger or a pen, a response signal thereof may be transferred to the touch screen panel 390.

The touch screen panel 390 may sense a user's touch position generated through the window layer 372, may perform an input function and/or a display function, and may include a touch sensor such as capacitive overlay, resistive overlay, or infrared beam or may include a pressure sensor. In addition to the sensors, sensors capable of detecting a touch or a pressure of an object may be included in the touch screen panel 390. The touch screen panel 390 may visually provide menus of the electronic device 300, input data, function setting information, and other types of information to the user. The touch screen panel 390 may be disposed in an upper portion of the polarizer 376, between the polarizer 376 and the organic light emitting layer 378, or between the impact absorbing layer 374 and the polarizer 376.

The protective film 392 may be bonded to a lower portion of the touch screen panel 390 through a fourth adhesive layer 391. The protective film 392 may physically support the window layer 372, the impact absorbing layer 374, the polarizer 376, the organic light emitting layer 378, the touch-sensitive layer 380, and the touch screen panel 390 disposed at an upper portion, and may prevent damage of the touch screen panel 390 that may occur during an attaching process of the window layer 372, the impact absorption layer 374, the polarizer 376, the organic light emitting layer 378, and the touch-sensitive layer 380 stacked on the touch screen panel 390 after the touch screen panel 390 is produced.

The cushion layer 394 may absorb an impact transferred through the window layer 372 and an impact transferred to a lower portion of the touch screen panel 390. The protective film 392 and the cushion layer 394 may be bonded through a fifth adhesive layer 393. The cushion layer 394 and the foldable housing 305 may be bonded through the sixth adhesive layer 395.

A conductive tape 351 and an FPCB 353 may be disposed in a lower portion of the foldable housing 305, and may be bonded to the foldable housing 305 to transfer a signal transferred from the touch screen panel 390 to the FPCB 353.

In order to prevent at least one of the window layer 372 and other components from being damaged by exposure to the outside of the window layer 372 upon folding, at least one of the window layer 372 and other components may be stacked with a predetermined gap.

Figure 10:
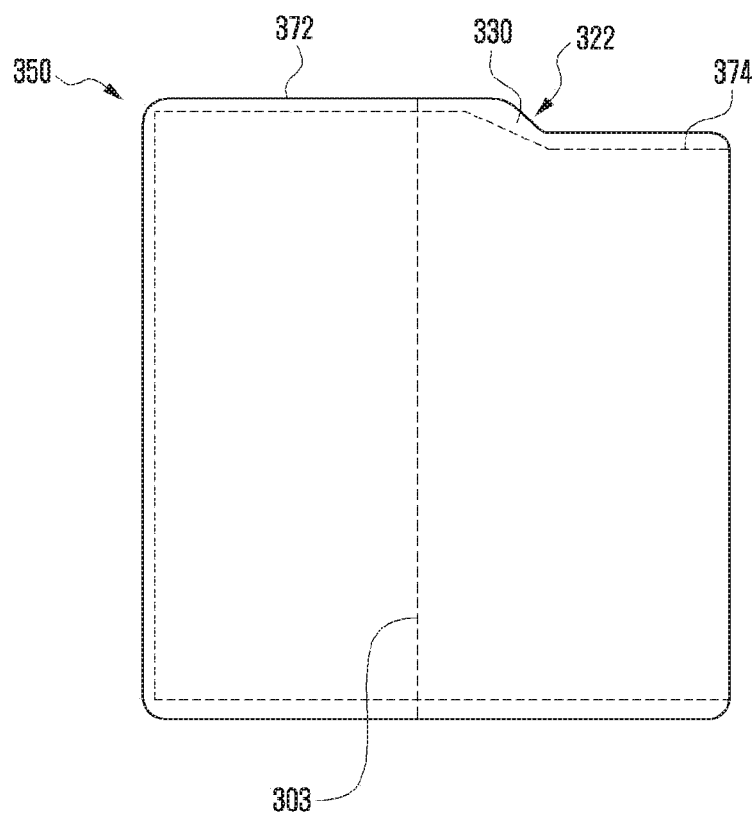
FIG. 10 illustrates an example of a configuration of a flexible display, according to an embodiment.

FIG. 10 illustrates an example of a configuration of a flexible display 350, according to an embodiment.

When the flexible display 350 is folded about the first axis 303, at an inflection point, such as an "L" shaped cutting point, at which a length of the flexible display 350 changes rapidly, due to the difference in cutting depth at each position, the difference in stress coefficient may occur according to a cutting position.

When the difference in stress coefficient occurs according to a position, if the flexible display 350 is folded, the difference occurs in a slip amount of subsidiary materials of the flexible display 350. Thus, flatness of the flexible display 350 may not be maintained, or part of the subsidiary material may be exposed to the outside of the window layer 372 at some cutting positions. The inflection point may abut the cutting portion 322 or the first periphery 330.

With reference to FIG. 10, the flexible display 350 may minimize the difference in a slip amount upon folding. A gap between the window layer 372 of the flexible display 350 and the impact absorbing layer 374 of the subsidiary materials may reduce as advancing from the upper end to the lower end of the inflection point, such as the cutting portion 322 or the first periphery 330. When the flexible display 350 is folded through such a configuration, by minimizing stress that may occur at the inflection point in which a length of the flexible display 350 changes rapidly, flatness of the flexible display 350 may be maintained, or part of the auxiliary material may be minimized from being exposed to the outside of the window layer 372 at some cutting positions.

Figure 11:
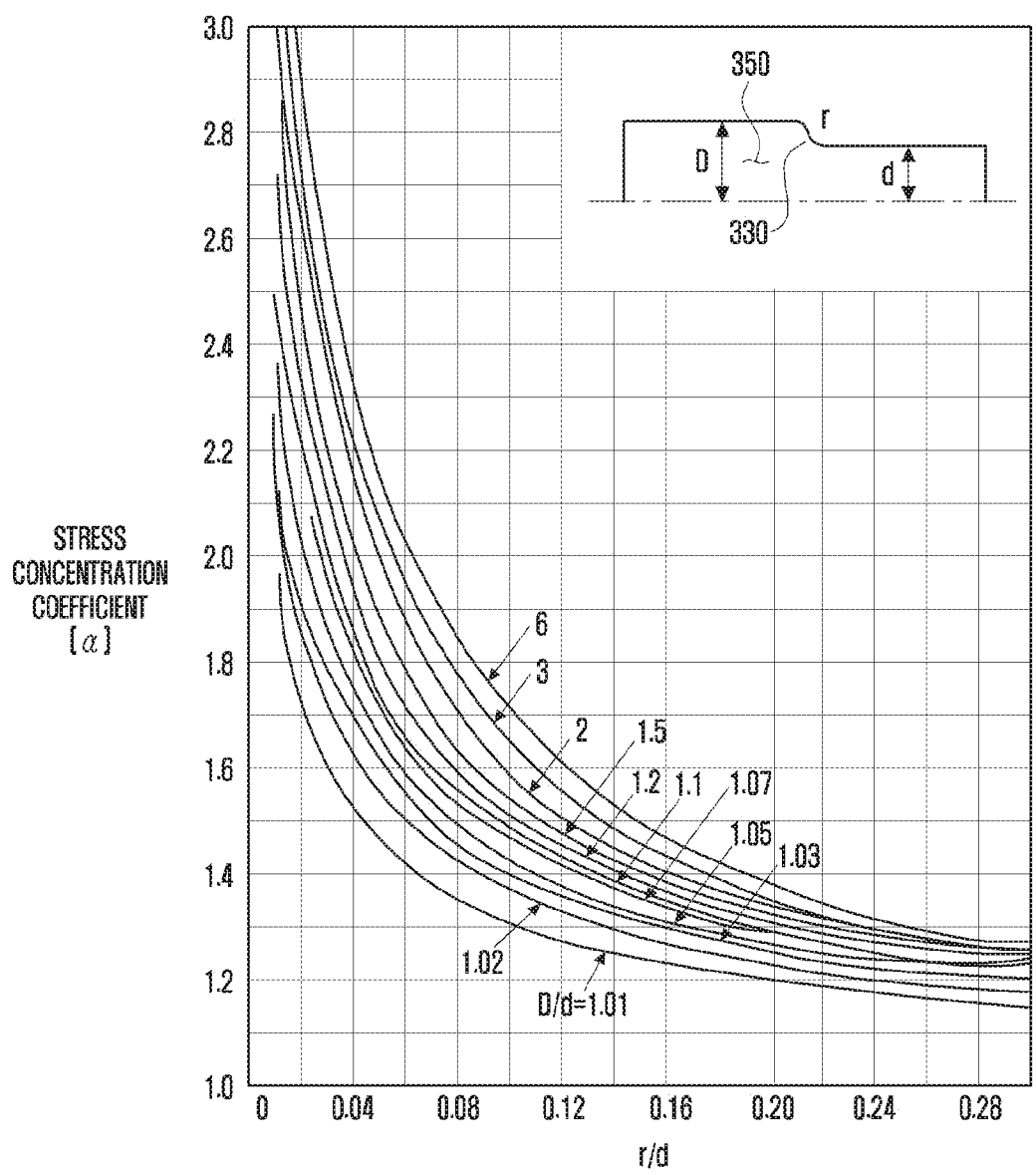
FIG. 11 illustrates stress coefficients of a flexible display positioned abutting a first periphery of an electronic device, according to an embodiment.

FIG. 11 illustrates stress coefficients of a flexible display 350 positioned abutting a first periphery 330 of an electronic device, according to an embodiment.

With reference to FIG. 11, in the flexible display 350 positioned abutting the first periphery 330, as a slope of a round (r) rapidly increases upon folding, stress concentration coefficient may increase. When a slope of a round (r) of the flexible display 350 positioned abutting the first periphery 330 is close to an L shape, such as when r of FIG. 11 is close to 0, and when D/d=infinity or when D is larger than d, the difference in the stress concentration coefficient may increase.

With reference to FIG. 11, as the round slope increases, such as a value of r increases, as a length of an oblique line increases, stress concentration coefficient (a) decreases, and as the length difference between D and d increases, the difference in stress concentration coefficient (a) increases. When the flexible display 350 positioned abutting the first periphery 330 is configured to have a round oblique line shape, if the flexible display 350 is folded, stress may be minimized that may occur at an inflection point such as the first periphery 330, at which a length of the flexible display 350 rapidly changes. In order to form an oblique line length, the oblique line shape may be formed with a straight line, a round, or a straight line and a round.

Figure 12:
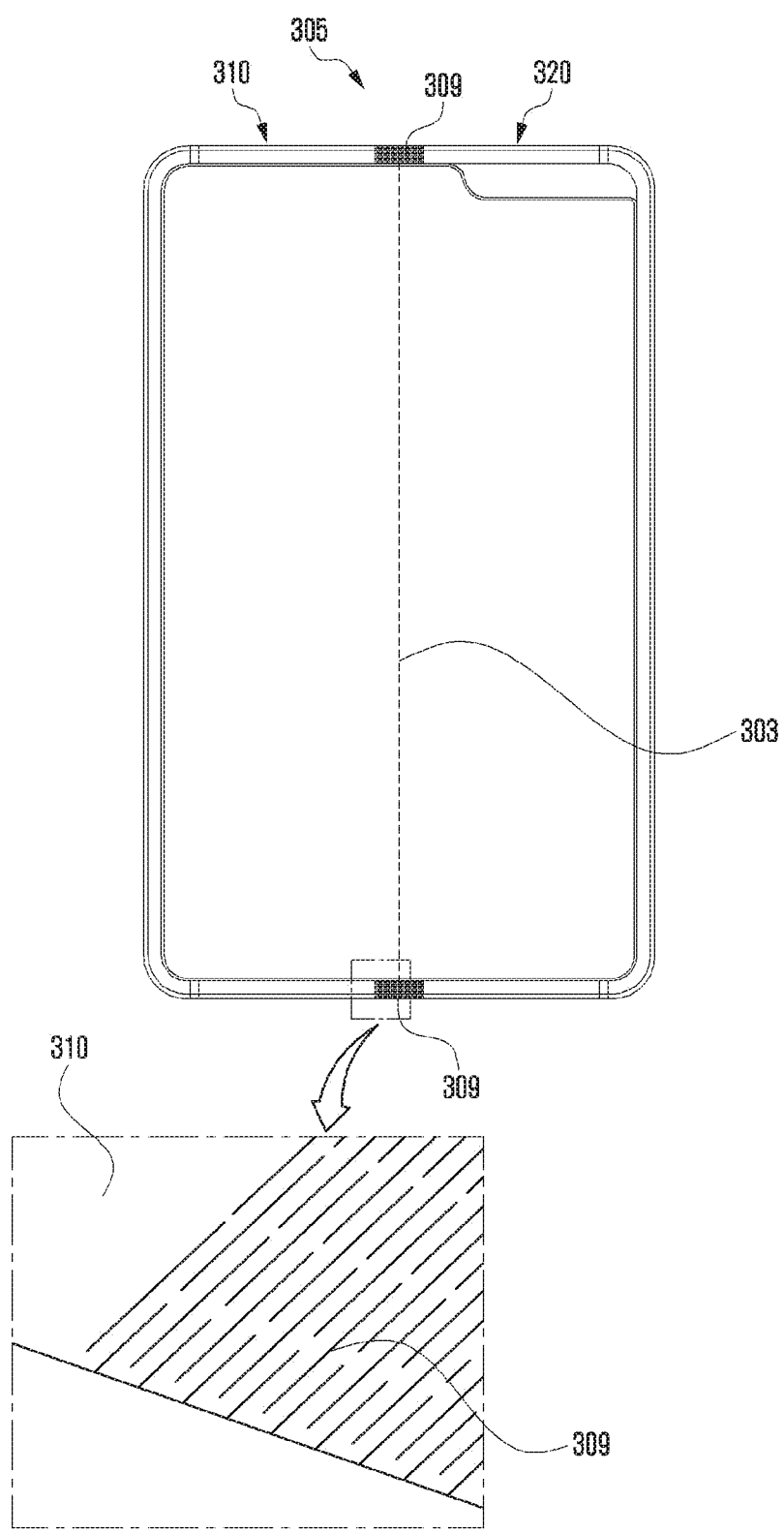
FIG. 12 illustrates another embodiment of a foldable housing of an electronic device, according to an embodiment.

FIG. 12 illustrates another embodiment of a foldable housing 305 of an electronic device, according to an embodiment.

With reference to FIG. 12, the foldable housing 305 may include a first housing structure 310 and a second housing structure 320 that may be configured foldably with respect to a first axis 303 extending in a first direction, such as a vertical direction.

A plate 309 having a lattice pattern may be disposed in at least part of an upper portion of the first axis 303 and at least part of a lower portion thereof. The at least part of the upper portion and the lower portion of the first axis 303 may include an inactive region or a dead space of the flexible display 350. The plate 309 may be made of a metal material of a predetermined thickness, such as 0.1 mm or less, and may smoothly perform a folding operation of the first housing structure 310 and the second housing structure 320. The plate 309 may have a robust structure against stresses according to a folding or unfolding operation of the first housing structure 310 and the second housing structure 320.

While a black masking area is minimized, an active region of a display can be maximally extended.

Upon folding, flatness of the display can be maintained by minimizing stress occurring at an inflection point at which a length of the display changes rapidly.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been shown and described with reference to embodiments thereof, it will be understood by those skilled in the art that changes in form and details may be made therein without departing from the spirit and scope of the present disclosure as defined by the appended claims and their equivalents.

What is claimed is:

1. An electronic device comprising:
 a foldable housing including:
 a first structure; and
 a second structure connected foldably to the first structure,
 wherein the first structure and the second structure are foldable with respect to each other about a first axis extending in a first direction, such that the second structure faces the first structure in a folded state, and such that the first structure and the second structure form a planar structure in an unfolded state, wherein the first structure and the second structure together define a recess that includes, when viewed from above the recess in the unfolded state, a first region between a first portion of the first structure and a first portion of the second structure so as to have a first width extending in a second direction perpendicular to the first direction, and a second region between a second portion of the first structure and a second portion of the second structure so as to have a second width extending in the second direction, wherein the second width is longer in length than the first width, wherein the first portion of the second structure is closer in distance to the first axis than the second portion of the second structure is to the first axis, wherein a flexible display is positioned in the recess, the flexible display including a first portion positioned in the first region of the recess, and a second portion positioned in the second region of the recess, and wherein the first portion of the second structure is closer in length to the first axis than the first portion of the first structure is to the first axis.

2. The device of claim 1,
wherein the first portion of the second structure has a first periphery abutting the first portion of the display.

3. The device of claim 2,
wherein the first periphery extends in the first direction.

4. The device of claim 2,
wherein at least part of the first periphery extends in a second direction that forms an acute angle in the first direction, such that the first width increases towards the second portion of the display.

5. The device of claim 4,
wherein the first periphery includes at least one curved portion.

6. The device of claim 5,
wherein the at least one curved portion includes a first curved portion at a first position, and a second curved portion at a second position, and
wherein the second position is closer in distance to the second portion of the display than the first position is to the second portion of the display.

7. The device of claim 6,
wherein the first curved portion is part of a first imaginary circle having a first imaginary center,
wherein the second curved portion is part of a second imaginary circle having a second imaginary center, and
wherein the first imaginary center and the second imaginary center are on opposite sides of an imaginary line formed by the at least part of the first periphery.

8. The device of claim 7,
wherein the first imaginary center is between the first and second portions of the first structure and the imaginary line, and
wherein the second imaginary center is between the first and second portions of the second structure and the imaginary line.

9. The device of claim 1,
wherein the flexible display includes a plurality of layers that are stacked one over another.

10. The device of claim 9,
wherein the plurality of layers includes at least two of an organic light emitting layer, a touch-sensitive layer, a polarizer, an impact absorbing layer, and a cushion layer.

11. The device of claim 9,
wherein at least part of the plurality of layers is not in physical contact with the first periphery.

12. The device of claim 1,
wherein a hinge is mounted between the first structure and the second structure such that the first structure and the second structure are foldable with respect to each other about the first axis.

13. The device of claim 12,
wherein the hinge is not exposed to upper portions of the first structure and the second structure, when the first structure and the second structure are in an unfolded state.

14. The device of claim 6,
wherein, when an electric object is disposed abutting the first periphery, a gap between the first curved portion of the first periphery and an upper portion of the electric object is larger than a gap between the second curved portion and a lower portion of the electric object.

15. The device of claim 6,
wherein a shape from the first curved portion to the second curved portion of the first periphery is a generally oblique line shape.

16. The device of claim 6,
wherein a slope from the first curved portion to the second curved portion is small.

17. The device of claim 10,
wherein the plurality of layers further includes at least one of a window layer, a touch screen panel, and a protective film.

18. The device of claim 1,
wherein a plate is disposed in at least part of an upper portion of the first axis and at least part of a lower portion of the first axis.

19. The device of claim 18,
wherein the plate has a lattice pattern.

* * * * *